No. 658,577. Patented Sept. 25, 1900.
P. NAEF.
APPARATUS FOR CRYSTALLIZING SOLIDS FROM LIQUIDS.
(Application filed June 14, 1900.)
(No Model.) 2 Sheets—Sheet 1.
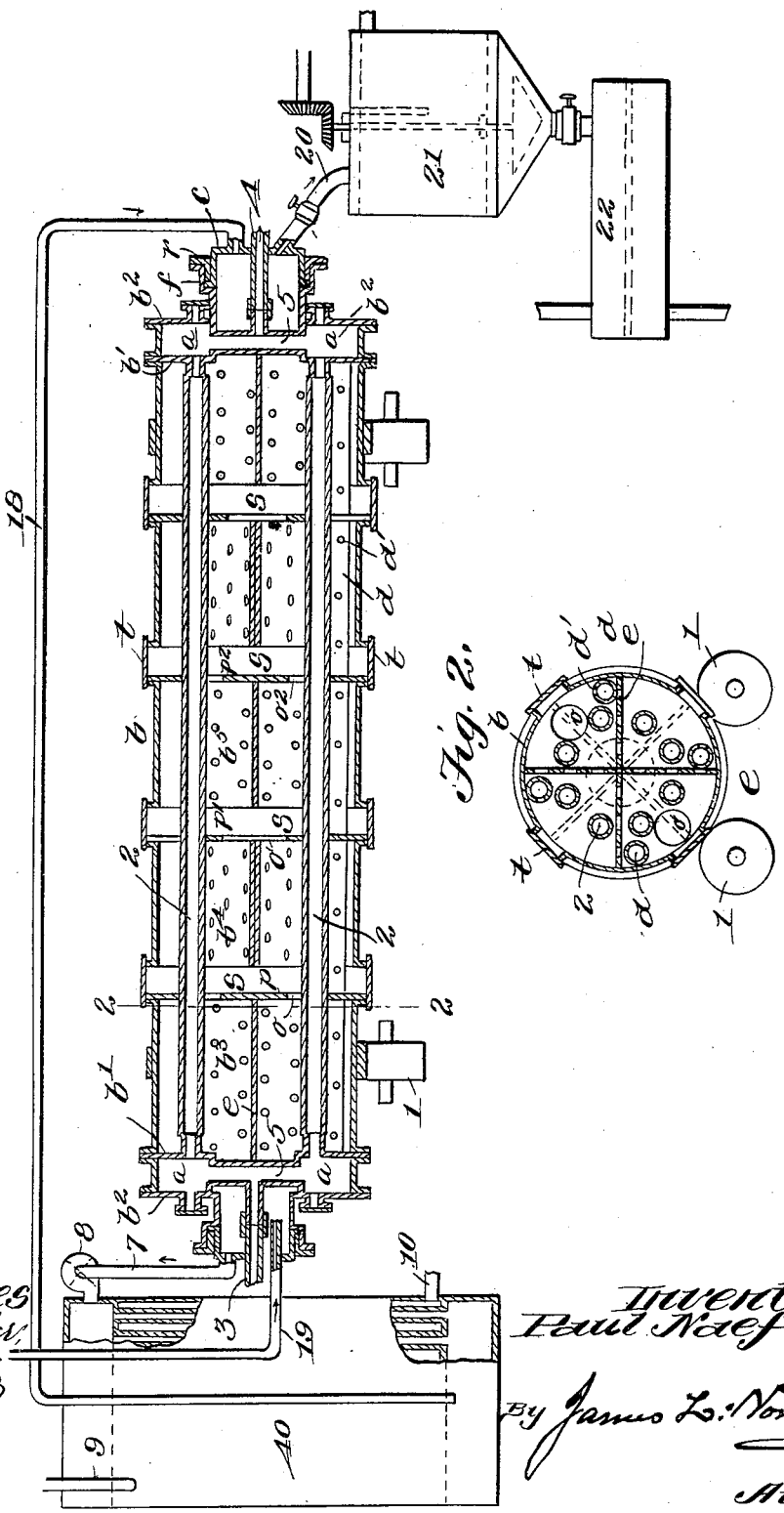

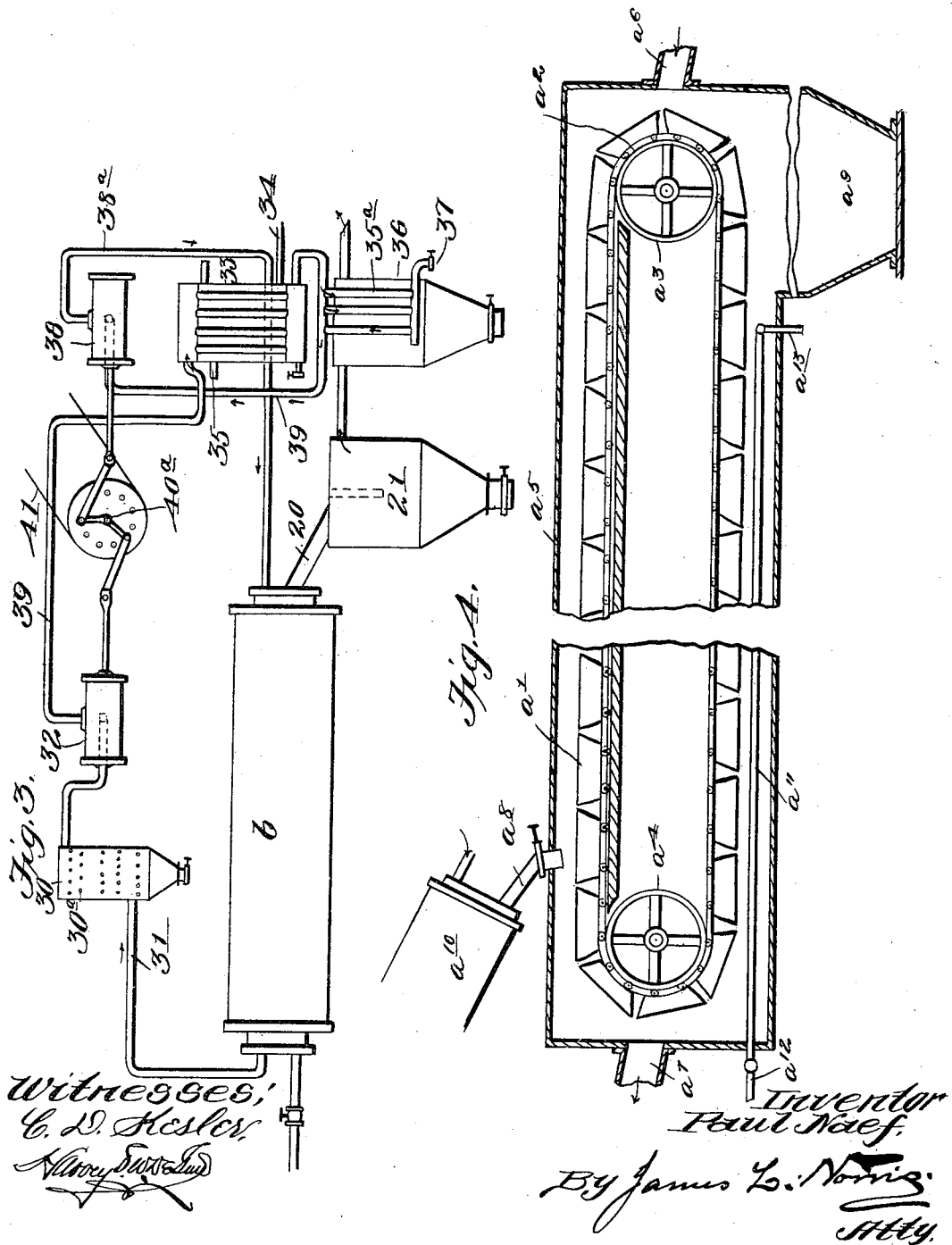

UNITED STATES PATENT OFFICE.

PAUL NAEF, OF NEW YORK, N. Y.

APPARATUS FOR CRYSTALLIZING SOLIDS FROM LIQUIDS.

SPECIFICATION forming part of Letters Patent No. 658,577, dated September 25, 1900.

Application filed June 14, 1900. Serial No. 20,359. (No model.)

*To all whom it may concern:*

Be it known that I, PAUL NAEF, a citizen of the Republic of Switzerland, residing at New York, in the county of New York and State of New York, have invented new and useful Improvements in Apparatus for Crystallizing Solids from Liquids, of which the following is a specification.

This invention relates to an improved apparatus for crystallizing solids from liquids and for other purposes.

It is one object of my invention to provide a convenient and economical form of apparatus in which a liquid can be made to flow in contact with continuously-cooled surfaces, while at the same time the said liquid is to be subjected to the action of a cold permanent gas made to flow through the liquid in an opposite direction.

Another object of the invention is to provide the apparatus with means for agitating the liquid and the gas simultaneously with the flow of the one through the other; also, to provide means for repeatedly cooling the gas in alternation with its passage through the liquid, and, further, to provide means for subsequently separating the crystallized solids from the liquid.

My invention consists in features of construction and in novel combinations of parts in a crystallizing apparatus, as hereinafter described and claimed.

In the annexed drawings, illustrating the invention, Figure 1 is a part-sectional elevation of the apparatus. Fig. 2 is a vertical transverse section of the apparatus on the line 2 2 of Fig. 1. Figs. 3 and 4 are sectional views illustrating an extension of the apparatus for use in various crystallizing operations.

Referring to the drawings, the letter $b$ designates a chamber in which the liquor or liquid to be treated is subjected to a low temperature for the separation of the solid matter to be crystallized therefrom. This chamber $b$ is preferably constructed in cylindrical form and is mounted on rollers 1 to be readily revolved by any suitable means, thereby agitating together the liquor and gas introduced into said chamber and which flow through the same in opposite directions and in intimate contact with each other. Instead of revolving this chamber, however, it may be provided internally with any suitable agitating apparatus.

As shown in the drawings, 2 2 represent cooling-pipes arranged in the cylinder or chamber $b$ and which terminate at each end of the cylinder in plates $b'$ $b'$. The pipes 2 may be secured to the plates $b'$ $b'$ by means of flanges or by the method usually employed in locomotive-boilers. There is an annular space between each of the plates $b'$ $b'$ and the end plates $b^2$ $b^2$ of the cylinder, with which spaces the pipes 2 communicate.

3 is the cooling-fluid-inlet pipe. 4 is the cooling-fluid-outlet pipe, and 5 5 are branch pipes, respectively connecting the pipes 3 and 4 with the smaller spaces $a$ between the plates $b'$ $b'$ and $b^2$ $b^2$. The cooling fluid enters by the pipe 3, passes through the pipes 2 2, and leaves by the pipe 4, as indicated by the arrows.

Each of the end plates $b^2$ is preferably provided with a flange $f$, into which fits a stationary cover $c$, provided with a rim. A suitable packing is to be placed between the flange $f$ and the cover $c$, and an adjustable ring $r$ is provided to hold said packing in position.

The liquor to be treated enters the cylinder or chamber $b$ through a pipe 19, and the liquor containing the crystallized solids leaves the opposite end of the chamber or cylinder $b$ by the pipe 20. The cooling-gas to be brought into contact with the liquor under treatment enters the cylinder $b$ through the pipe 18 and leaves through the pipe 7.

The interior of the cylinder may be divided into sections $b^3$ $b^4$ $b^5$, provided with perforated longitudinally-arranged partitions $e$, which may sometimes consist of wire-gauze. Between these sections are open spaces $s$, which are accessible for cleaning purposes through suitable manholes $t$, as shown. The said longitudinally-arranged partitions $e$ of each section are preferably arranged in radial offset positions or at an angle to the longitudinal partitions of the adjacent section or sections, as shown in Fig. 2, in such manner that the longitudinal partitions of one section will alternate with the longitudinal partitions of the adjacent section. This arrangement insures a very intimate contact of the liquor and the cold gas in their passage through the cylinder or chamber $b$. Vertical cross-partitions $p\ p'\ p^2$, respectively provided with openings $o\ o'\ o^2$, are arranged in the cylinder $b$ in such manner as to cause the cold gas to pass through the cylinder in a zigzag path.

For the purpose of lifting the liquor and showering it onto the perforated longitudinally-arranged partitions $e$ as the cylinder revolves pipes $d\ d$, provided with openings $d'\ d'$, are arranged longitudinally within the said chamber or cylinder $b$. These pipes $d\ d$ may be formed on or adjacent to the longitudinal partitions $e$ or they may be fastened to the cylinder, and the said pipes may extend throughout the length of the cylinder, or if the cylinder is divided into sections the said pipes may also be formed in corresponding sections. The perforated pipes $d$ are so arranged that the liquor lifted by them is discharged through their perforations onto the perforated longitudinally-arranged partitions $e$ during the whole revolution of the cylinder. Obviously if the cylinder or chamber $b$ is mounted in a stationary or fixed position the longitudinally-arranged partitions $e$ would be omitted, and it that case any suitable agitating mechanism would be provided within the cylinder or chamber.

For the purpose of cooling the gas that is to be brought into contact with the liquor being treated and to provide for the circulation of this gas there is provided a gas-cooler 40, which may be of any suitable construction, preferably comprising a suitable casing having a system of cooling-pipes therein. The cooled gas is drawn from the lower part of this cooler through the pipe 18, that leads into one end of the cylinder or chamber $b$, and after passing through the cylinder $b$ and in contact with the liquor therein the gas leaves the other end of said cylinder through the pipe 7 and is discharged therefrom into the upper part of said cooler, a fan 8 being provided to cause a continuous circulation of gas through the cylinder $b$ and gas-cooler 40 in such manner that gas cooled to a very low temperature will be continuously circulated through the liquor under treatment. The gas is cooled in the cooler 40 by circulating a cooling fluid through the space surrounding the pipes in said cooler. This cooling fluid enters the cooler through a pipe 9 and leaves the said cooler through a waste-pipe 10.

By referring to Fig. 1 it will be seen that the liquor under treatment passes through the cylinder $b$ in a reverse direction to the passage of the cold gas through said cylinder or chamber and in contact with said liquor, and as the liquor is thus brought into intimate contact with the cold gas the crystallization of the solids contained in said liquor is very rapid, and the apparatus has a large capacity without necessarily occupying much space. The liquor that has been thus treated in the cylinder or chamber $b$ leaves the cylinder or chamber through the pipe 20, and is thereby conducted to a settling-tank 21, which may be fitted with an agitator. This liquor that flows from the chamber or cylinder $b$ will hold in suspension some of the crystallized solids, and is therefore drawn from the tank 21 into a suitable filter 22, where it is washed for the separation of the crystals. Whenever deemed necessary, access may be had to the interior of the cylinder or chamber $b$ through its manholes $t$ to remove any deposit of crystals in said cylinder or chamber, and these crystals or separated solids may be washed or otherwise further treated, as desired. In the apparatus shown in the drawings the crystals leave the apparatus suspended in the liquor and are separated from the liquor in the settling-tank. The liquor flows continuously from the latter. The crystals are withdrawn in the form of a sludge from the conical bottom of the settling-tank and are washed and dried on a filter or other suitable apparatus. The crystals are thus continuously removed from the liquor.

The apparatus described can be used for the treatment of various substances and is of special advantage, if cooling from the outside is difficult, through the deposition of crust and crystals on the cooling-surface. If solid crystalline masses have to be produced, it is of advantage to keep the apparatus at such a temperature that a sludge containing the crystals in suspension leaves the same. This sludge may be run into vessels, and here complete solidification takes place by further cooling, or the crystals are separated from the liquor in a suitable press, whereby solid blocks are produced. If large crystals are to be produced, the liquor is not agitated, but is moved very slowly. The same liquor may be circulated through the apparatus several times by suitable pumps. The crystallizing vessel can be so arranged that the crystals as they are formed settle into a lower part, from which they can be withdrawn.

In its flow through the chamber $b$ the liquid under treatment is constantly exposed to the continuously-cooled surfaces of the cooling-pipes 2, the liquid being thus cooled, as it were, from the exterior, and at the same time the liquid is still further cooled by the passage through the same of a cold gas that is repeatedly cooled in alternation with its contact with the liquid treated.

Instead of cooling the gas in a gas-cooler the cooling can be effected by compressing the gas used in the crystallizing apparatus, cooling the same and expanding it with abstraction of work. For this purpose the gas is first conducted through a vessel 30, containing wire-gauze partitions $30^a$, for the purpose of removing all the liquid particles from the gas, which is drawn off at 31. The gas then passes into the compression-cylinder 32, in which it is compressed. The hot compressed gas passes into cooler 33, which consists of a pipe system. The gas passes through the pipes. In the chamber surrounding the pipes circulates water entering at 35 and leaving at 34, which water is afterward used in the steam-boilers which operate the plant. If the plant is operated without boilers, I pass air through the space surrounding the cooling-pipes in at 35 and out at 34 and use the same afterward in the gas-engines or also sometimes for combustion of fuel. The gas is now further cooled to remove all moisture by passing it through a coil $35^a$, placed in the liquor coming from the revolving cylinder. This coil is placed in a tank 36, which may receive liquor from the settling-tank 21. The coil has means 37 for withdrawing condensed water. The cooled and dried gas is now conducted into cylinder 38 by pipe 39, where it expands and at the same time performs work. Both cylinders work on the same shaft $40^a$, which is driven from a belt 41. The cooled gas from cylinder 38 is now returned to the revolving cylinder by pipe $38^a$, and a continuous circulation of cooled gas is thus maintained.

The system can be applied for the manufacture of ice. It is then of advantage to proceed as follows: The liquor is passed through the first crystallizing vessel to cool it as much as possible. Then it is run into a series of vessels $a'$, in which complete solidification takes place with as little agitation as possible. The vessels are cooled by circulating cooled gas around them, and cooling-pipes can further with advantage be placed in the chamber containing them. With great advantage the vessels are arranged in a continuous row and are moved by an endless chain $a^2$ or in another suitable manner. They advance some distance horizontally until they reach a roller $a^3$, over which the chain carrying them travels, and then return in reversed direction until they pass over another roller $a^4$, which brings them back again into the same position. The whole is inclosed by a chamber $a^5$, through which the cooled gas passes preferably before it enters the revolving cylinder, entering at $a^6$ and leaving at $a^7$. Water runs continuously into the first vessel $a'$ through $a^8$, all the vessels being filled with liquor when they go in one direction. The temperature is gradually reduced until complete freezing is reached. When the vessels turn around the roller $a^3$, the ice is discharged into a suitable hopper $a^3$ at the bottom of the chamber inclosing the endless chain of vessels. These vessels can be used by themselves without a revolving cylinder for producing ice. The water is perfectly freed from gas before it runs into the vessels. If a revolving cylinder $a^{10}$ is used, through which the water passes first, a vacuum is maintained in the same for this purpose. A cooling fluid can be circulated through pipe $a^{11}$ in the chamber, entering at $a^{12}$ and leaving at $a^{13}$.

The apparatus described can be modified to solidify material and simultaneously heat the same. A similar arrangement can be used for crystallizing sugar. The solution can be brought to partial crystallization in an apparatus like the revolving cylinder and is from that passed into the endless chain of vessels, where it completely solidifies. The vessels can also be used by themselves. With greatest advantage I use an endless row of vessels $a'$, so arranged that in the first part crystallization takes place, while later on the vessels pass through a chamber through which hot gas is passed for drying purposes, the whole arrangement forming a continuous system. If it is necessary to wash the crystallized material, the chain of vessels passes first through a chamber where crystallization takes place by means of cold gas, if necessary, assisted by cooling-tubes. Afterward it passes through an arrangement where washing takes place, the liquor being drawn off by a suitable valved opening at the bottom of the vessels, if desired, by a vacuum. Afterward the vessels on the chain pass through a chamber through which warm gas circulates, whereby drying takes place. The finished material is discharged at the end when the vessels turn on the rollers to begin their return journey. The whole is a continuous and automatic system.

Having described my invention, what I claim is—

1. In apparatus for treating liquid with cold gas, for crystallization of solids, the combination of a crystallizing-chamber having a series of cooling-pipes therein, means for causing a cooling fluid to flow through said pipes, an inlet-pipe communicating with one end of said chamber for introducing the liquid to be treated, an outlet-pipe for flow of said liquid from the other end of said chamber, a settling-tank to receive liquid from said outlet-pipe, a gas-cooler, and means for continuously circulating gas through said cooler and crystallizing-chamber, whereby the gas is repeatedly cooled in alternation with its passage through the liquid in said chamber.

2. The combination of a chamber having a series of cooling-pipes therein, means for causing a cooling fluid to flow through said pipes, means for passing through said chamber the liquid to be treated, a settling-tank to receive said liquid from one end of said chamber, a filter in communication with the settling-tank, a gas-cooler, and means for continuously circulating gas through said cooler and through said chamber in a reverse direction to the flow of liquid through the chamber.

3. The combination of a chamber having a series of cooling-pipes therein, means for causing a cooling fluid to flow through said pipes, an inlet-pipe for introducing liquid to be treated into one end of said chamber, an outlet-pipe for flow of said liquid from the other end of said chamber, a settling-tank to receive liquid from said chamber, a gas-cooler, means for continuously circulating gas through said cooler and chamber in intimate contact with the liquid treated, and means for agitating the liquid and gas in said chamber.

4. The combination of a chamber for treating liquid with gas, a series of cooling-pipes extended longitudinally in said chamber, means for causing a cooling fluid to flow through said pipes; an inlet-pipe for introducing liquid to be treated into one end of said chamber, an outlet-pipe for flow of said liquid from the other end of said chamber, agitating devices located in said chamber, a settling-tank to receive liquid from said chamber, a gas-cooler, and means for continuously circulating gas through said cooler and through the liquid in said chamber.

5. The combination of a revolving chamber, perforated partitions arranged in sections within said chamber, each section being radially offset from adjoining sections and with spaces between the several sections, cooling-pipes extended longitudinally in said chamber, inlet and outlet pipes provided with branches communicating with said cooling-pipes through annular spaces at opposite ends of said chamber for continuous flow of cooling fluid through the cooling-pipes, means for causing a flow through said chamber of a liquid to be treated therein with cold gas, a gas-cooler, and means for continuously circulating gas through said cooler and chamber.

6. The combination of several crystallizing vessels forming an endless chain, means for first cooling said vessels, means for washing the crystals in said vessels and means for afterward drying the crystals in said vessels, the whole forming a continuous system.

7. The combination of a crystallizing vessel, means for passing a gas through the same, means for compressing the gas, cooling it in the compressed state and reëxpanding it in a working cylinder before it enters the crystallizing vessel.

8. The combination of a vessel for containing liquor, means for passing gas through the same, means for compressing the gas leaving the vessel, means for cooling the compressed gas by the liquor running from the vessel, means for expanding it in a working cylinder and returning it to the vessel.

9. The combination of a crystallizing-chamber for containing liquor, means for passing gas through the liquor in said chamber, a gas-compressor to receive gas from said chamber, a gas-cooler in communication with the compressor, a cylinder in which the cooled gas is expanded, and means for returning the expanded gas to the crystallizing-chamber.

10. The combination of a chamber for containing liquor, means for passing gas through the liquor in said chamber, a series of traveling crystallizing vessels, means for conducting liquor from said chamber into the said series of crystallizing vessels, successively, a chamber surrounding said series of vessels, and means for controlling the temperature of said chamber.

11. The combination of a chamber for containing material to be cooled, means for passing gas through said chamber, a gas-compressor to receive gas from said chamber, means for partially cooling the compressed gas, a device for afterward cooling the same gas to a lower temperature by means of the cooled material, a cylinder in which said cooled gas is expanded, and means for conducting the expanded gas from said cylinder to the material in the said chamber.

In testimony whereof I have hereunto set my hand in presence of two subscribing witnesses.

PAUL NAEF.

Witnesses:
C. E. LANGDON,
GWENIT SMITH.